Nov. 25, 1930.  L. JAENICHEN  1,782,654

WEIGHING SCALE

Filed Nov. 27, 1928

INVENTOR.
Louis Jaenichen
BY
Francis D. Hardesty
ATTORNEY.

Patented Nov. 25, 1930

1,782,654

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, A CORPORATION OF MICHIGAN

WEIGHING SCALE

Application filed November 27, 1928. Serial No. 322,261.

The present invention relates to weighing scales and has among its objects a scale which shall be capable of determining heavy weights but yet be of sufficient sensitivity to accurately determine small weights or fractions of the heavier weight units.

Another object is a scale in which a quite sensitive scale is combined with another scale adapted for larger and heavier increments.

Figure 1:
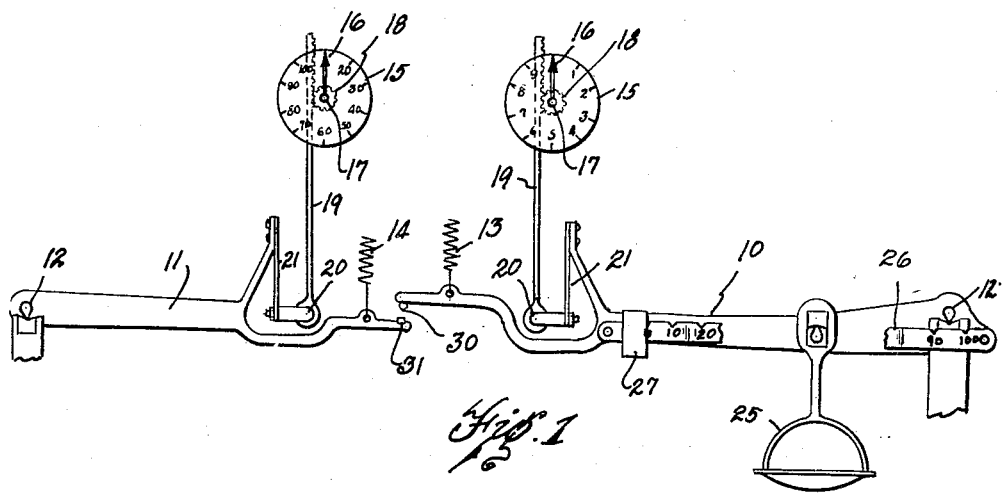

Still other objects will be readily observed by those skilled in the art upon reference to the following description and the accompanying drawing, in which Fig. 1 is a more or less diagrammatic elevation of a scale embodying the invention.

Figure 2:
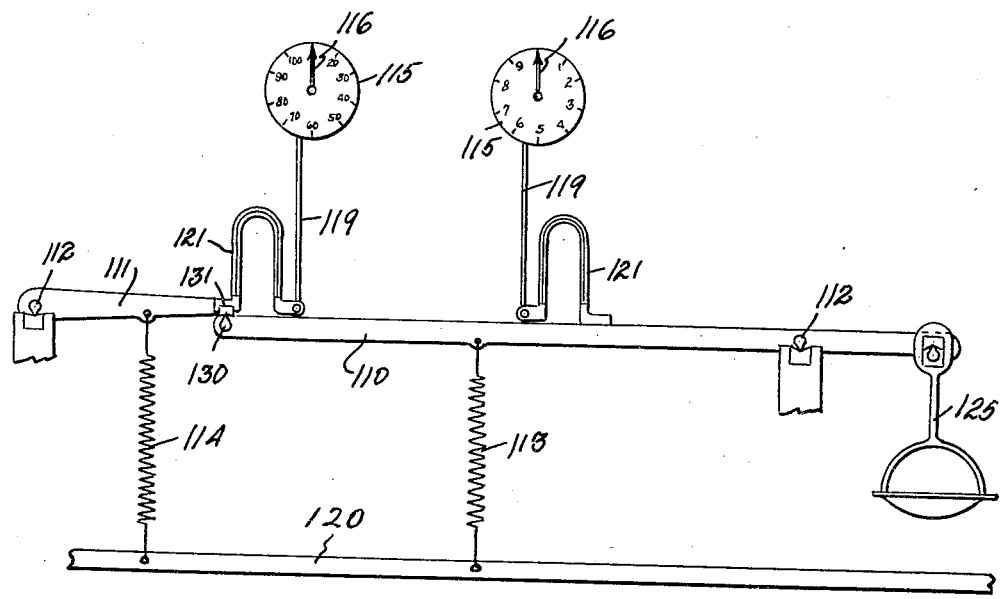

Fig. 2 is a similar view of a modified form.

In the drawings the scale is shown as consisting of two weighing levers 10 and 11 each mounted on its pivot 12 and having their free ends supported by the load resisting springs 13 and 14 respectively.

Intermediate its ends each lever is provided with a rack adapted to actuate weight indicating mechanism comprising a dial 15 and a pointer 16 mounted on a shaft 17 on which is the gear 18 adapted to be actuated by the rack 19. It is preferred to mount the racks 19 pivotally as at 20 and provide each with a thermostat 21 adapted to move the pivots 20 lengthwise of the lever in order to compensate for changes in temperature.

The lever 10 is provided intermediate its length with a suitable weight pan 25 and also with a graduated bar 26 on which is movable a counterpoise 27 for a purpose to be described later. The free end of this lever 10 is also provided with a suitable hardened point 30 adapted to rest under certain conditions on a cooperating hardened surface member 31 carried by the free end of lever 11.

The two springs 13 and 14 are of unequal resistance to loading and are preferably, in this respect, in the ratio of ten to one or some other suitable multiple. The dials 15 will accordingly be graduated to agree with the unequal resistance of the spring. It is preferred to make the spring 14, of, say, ten times the load resistance of that of the spring 13.

With this in mind, the operation of the scale is quite simple and easily understood.

When a load is placed on the pan 25, if the load is less than ten units as indicated on the dial operated by lever 10, the entire weight will be indicated on this dial. As soon, however, as the load is greater than ten, the two members 30 and 31 come together and a part of the load is supported by the spring 14. In such case the approximate weight of the total load will be seen on the left hand dial and to assume a case, suppose it is indicated as over 30 and less than 40. In order to accurately gauge the amount over 30, the counterpoise 27 will be moved to the right to the graduated points 30 and 31. When this has been done the units of weight will then be indicated on the right hand dial.

In Fig. 2, is shown a similar scale in which instead of using the load resisting springs suspending the levers, they are below and stretched upwardly. In this form the lever 110 is provided with a weight pan 125, a load resisting spring 113 anchored to the base 120, a rack 119, a dial 115, and pointer 116. A thermostat 121 is provided to compensate for changes in temperature. The other lever 111 is provided with its loading resisting spring 114 also anchored to base 120 and also the thermostat 121, rack 119, dial 115, and pointer 116. The levers will be pivoted as at 112 and, in the case of lever 110, the pivot will be between the load pan 125 and the spring 113. At 130 and 131 are shown the contact points between the two levers.

The operation of this form of the device is exactly the same as that of the other, the counterpoise not being shown for the sake of clarity.

Now, having described the invention and the preferred forms of embodiment thereof, it is to be understood that the said invention is to be limited not to the specific details herein described and illustrated, but only by the scope of the claims which follow.

I claim:—

1. In a scale, a pair of levers, one of which is provided with a load receiver and a sensitive load resisting element and the other of which is provided with a load resisting element adapted to resist heavier loads than the first, said first lever adapted to act independently to weight small loads and adapted to act upon said second lever as a load thereon when the loading in the load receiver exceeds a predetermined amount.

2. In a weighing scale, a weighing lever adapted for heavy loads and provided with weight indicating mechanism graduated to indicate large increments, a second lever adapted to weigh small loads and provided with weight indicating mechanism indicating small increments, said second lever being adapted to load said first lever when the material being weighed exceeds a predetermined amount.

3. In a weighing scale, a weighing lever adapted for heavy loads and provided with weight indicating mechanism graduated to indicate large increments, a second lever adapted to weigh small loads and provided with weight indicating mechanism indicating small increments, said second lever being adapted to load said first lever when the material being weighed exceeds a predetermined amount, and means carried by one of said levers to counterpoise the weight of the load in excess of said predetermined amount.

4. In a weighing scale, a weighing lever adapted for heavy loads and provided with weight indicating mechanism graduated to indicate large increments, a second lever adapted to weigh small loads and provided with weight indicating mechanism indicating small increments, said second lever being adapted to load said first lever when the material being weighed exceeds a predetermined amount, and means carried by one of said levers to counterpoise the weight of the load in excess of said predetermined amount, said means comprising a graduated bar and sliding counterpoise on said second lever.

LOUIS JAENICHEN.